(12) United States Patent
Nakayama

(10) Patent No.: US 9,182,610 B2
(45) Date of Patent: Nov. 10, 2015

(54) IMAGE BLUR CORRECTION APPARATUS AND IMAGING APPARATUS

(71) Applicant: Sony Corporation, Tokyo (JP)

(72) Inventor: Tatsuyuki Nakayama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 147 days.

(21) Appl. No.: 13/858,972

(22) Filed: Apr. 9, 2013

(65) Prior Publication Data

US 2013/0321919 A1 Dec. 5, 2013

(30) Foreign Application Priority Data

May 29, 2012 (JP) ................................. 2012-122334

(51) Int. Cl.
 *G02B 27/64* (2006.01)

(52) U.S. Cl.
 CPC ...... *G02B 27/646* (2013.01); *G03B 2205/0023* (2013.01)

(58) Field of Classification Search
 USPC ....................................................... 359/557
 See application file for complete search history.

(56) References Cited

U.S. PATENT DOCUMENTS

| 7,783,179 | B2 * | 8/2010 | Takahashi | 396/55 |
| 8,792,166 | B2 * | 7/2014 | Watanabe et al. | 359/557 |
| 2008/0187301 | A1 * | 8/2008 | Takahashi | 396/55 |
| 2013/0321916 | A1 * | 12/2013 | Nakayama | 359/557 |
| 2013/0321918 | A1 * | 12/2013 | Nakayama | 359/557 |

FOREIGN PATENT DOCUMENTS

| JP | 07-274056 A | 10/1995 | |
| WO | WO 2011155178 A1 * | 12/2011 | G03B 17/00 |

\* cited by examiner

*Primary Examiner* — Stephone B Allen
*Assistant Examiner* — Balram Parbadia
(74) *Attorney, Agent, or Firm* — Hazuki International, LLC

(57) ABSTRACT

An image blur correction apparatus including a lens unit configured to include at least one lens and configured to be turnable in a first direction which is a direction about a first supporting axis that is orthogonal to a light axis of the lens with respect to an outer housing, and in a second direction which is a direction about a second supporting axis that is orthogonal to the light axis and the first supporting axis, a fixed member configured to be arranged on an outer periphery side of the lens unit and configured to turnably support the lens unit in the first direction and the second direction, a first drive unit configured to turn the lens unit in the first direction, and a second drive unit configured to turn the lens unit in the second direction.

10 Claims, 16 Drawing Sheets

20 ··· IMAGE BLUR CORRECTION APPARATUS
21 ··· LENS UNIT
22 ··· FIXED MEMBER
22a ··· SUPPORT PORTION
24 ··· SLIDE PORTION
25 ··· SPHERE HOLDING FRAME
25a ··· CONCAVE INSERTION PORTION
26 ··· SPHERE
29 ··· TURNING ACTUATOR
35 ··· FIRST DRIVE UNIT
36 ··· SECOND DRIVE UNIT

1 · · · IMAGING APPARATUS
2 · · · OUTER HOUSING
20 · · · IMAGE BLUR CORRECTION APPARATUS
21 · · · LENS UNIT

1 ···· IMAGING APPARATUS
2 ··· OUTER HOUSING

20 ··· IMAGE BLUR CORRECTION APPARATUS
21 ··· LENS UNIT
22 ··· FIXED MEMBER
25 ··· SPHERE HOLDING FRAME
29 ··· TURNING ACTUATOR

21 ··· LENS UNIT
24 ··· SLIDE PORTION
29 ··· TURNING ACTUATOR

21 · · · LENS UNIT
25 · · · SPHERE HOLDING FRAME
26 · · · SPHERE
29 · · · TURNING ACTUATOR

20 ··· IMAGE BLUR CORRECTION APPARATUS
21 ··· LENS UNIT
22 ··· FIXED MEMBER
22a ··· SUPPORT PORTION
24 ··· SLIDE PORTION
25 ··· SPHERE HOLDING FRAME
25a ··· CONCAVE INSERTION PORTION
26 ··· SPHERE
29 ··· TURNING ACTUATOR
35 ··· FIRST DRIVE UNIT
36 ··· SECOND DRIVE UNIT

21 · · · LENS UNIT
22 · · · FIXED MEMBER
22a · · · SUPPORT PORTION
24 · · · SLIDE PORTION
25 · · · SPHERE HOLDING FRAME
25a · · · CONCAVE INSERTION PORTION
26 · · · SPHERE

21 ··· LENS UNIT
22 ··· FIXED MEMBER
22a ··· SUPPORT PORTION
24 ··· SLIDE PORTION
25 ··· SPHERE HOLDING FRAME
25a ··· CONCAVE INSERTION PORTION
26 ··· SPHERE

21 ··· LENS UNIT
25 ··· SPHERE HOLDING FRAME
26 ··· SPHERE
29 ··· TURNING ACTUATOR

20A · · · IMAGE BLUR CORRECTION APPARATUS
21A · · · LENS UNIT
22A · · · FIXED MEMBER
22a · · · SUPPORT PORTION
26 · · · SPHERE

20B · · · IMAGE BLUR CORRECTION APPARATUS
21B · · · LENS UNIT
22B · · · FIXED MEMBER
26 · · · SPHERE

20 · · · IMAGE BLUR CORRECTION APPARATUS
21 · · · LENS UNIT
22 · · · FIXED MEMBER
22a · · · SUPPORT PORTION
24 · · · SLIDE PORTION
25 · · · SPHERE HOLDING FRAME
25a · · · CONCAVE INSERTION PORTION
26 · · · SPHERE
29 · · · TURNING ACTUATOR
35 · · · FIRST DRIVE UNIT
36 · · · SECOND DRIVE UNIT

20 · · · IMAGE BLUR CORRECTION APPARATUS
21 · · · LENS UNIT
22 · · · FIXED MEMBER
22a · · · SUPPORT PORTION
24 · · · SLIDE PORTION
25 · · · SPHERE HOLDING FRAME
25a · · · CONCAVE INSERTION PORTION
26 · · · SPHERE

21 ··· LENS UNIT
22 ··· FIXED MEMBER
22a ··· SUPPORT PORTION
24 ··· SLIDE PORTION

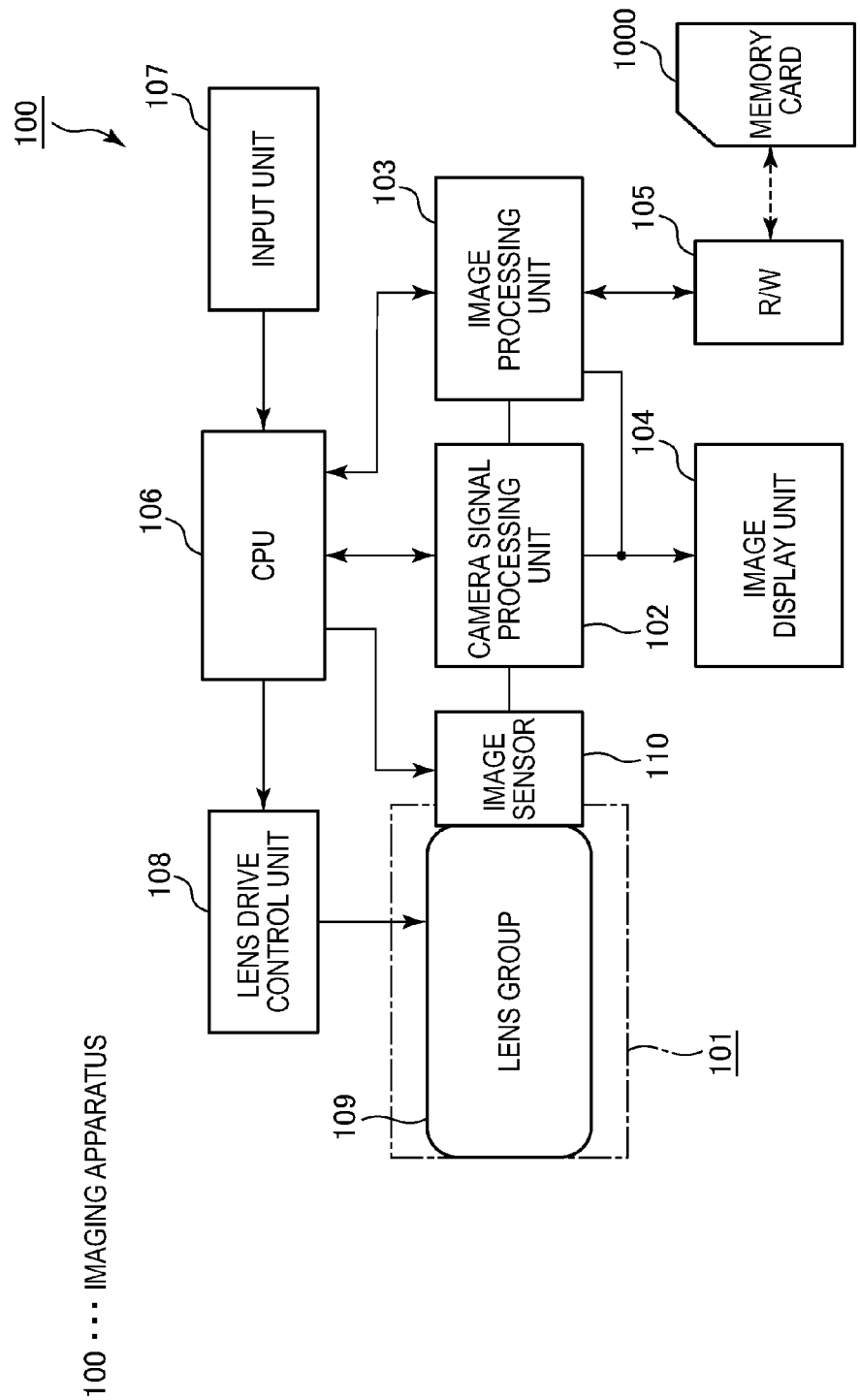

# IMAGE BLUR CORRECTION APPARATUS AND IMAGING APPARATUS

BACKGROUND

The present technology relates to a technical field regarding image blur correction apparatuses and imaging apparatuses. More specifically, the present technology relates to a technical field for making the configuration simpler and more compact by forming a spherical slide portion on an outer periphery of a lens unit and forming a spherical support portion that is configured so that the slide portion can slide along an inner periphery of a fixed member.

In an imaging apparatus such as a video camera and a still camera, an image blur correction apparatus may be provided for correcting image blur by moving a lens in a direction orthogonal to the light axis direction.

The image blur correction apparatus provided in such an imaging apparatus may be configured so that a lens unit, which has a lens, turns in a first direction about a first supporting axis that is orthogonal to the light axis of the lens with respect to an outer housing, and in a second direction that is a direction about a second supporting axis orthogonal to the light axis and the first supporting axis (e.g., refer to JP H7-274056A).

Image blur correction is performed by the lens unit being turned in a yaw direction about the first supporting axis, and in a pitch direction about the second supporting axis.

In the image blur correction apparatus described in JP H7-274056A, two gimbal mechanisms, each having a base plate curved in an L shape, are provided to turn the lens unit in the yaw direction and the pitch direction.

The image blur operation is carried out in the pitch direction by turning the lens unit in the pitch direction with respect to one of the gimbal mechanisms, and in the yaw direction by turning the lens unit together with the first gimbal mechanism in the yaw direction with respect to the other gimbal mechanism.

SUMMARY

However, in the image blur correction apparatus described in JP H7-274056A, two gimbal mechanisms are provided to turn the lens unit in the yaw direction and the pitch direction, so that the number of parts is unfortunately increased and the configuration becomes more complex by their presence.

Further, since a part of the two gimbal mechanisms overlap in the direction orthogonal to the light axis, therefore, the size in the direction orthogonal to the light axis is increased, which hinders making the apparatus more compact.

Accordingly, there is a need for an image blur correction apparatus and an imaging apparatus to make the configuration simpler and more compact.

According to a first embodiment of the present disclosure, there is provided an image blur correction apparatus including a lens unit configured to include at least one lens and configured to be turnable in a first direction which is a direction about a first supporting axis that is orthogonal to a light axis of the lens with respect to an outer housing, and in a second direction which is a direction about a second supporting axis that is orthogonal to the light axis and the first supporting axis, a fixed member configured to be arranged on an outer periphery side of the lens unit and configured to turnably support the lens unit in the first direction and the second direction, a first drive unit configured to turn the lens unit in the first direction, and a second drive unit configured to turn the lens unit in the second direction. A spherical slide portion is formed on an outer periphery of the lens unit using, as a center, a reference point that is a point in the lens unit. A spherical support portion is formed on an inner periphery of the fixed member using the reference point as a center. The slide portion is capable of sliding along the support portion when the lens unit is turned in each of the first direction and the second direction.

Therefore, in the image blur correction apparatus, the slide portion slides along the support portion, and the lens unit is turned in the first direction and the second direction.

According to a second embodiment of the present disclosure, as for the image blur correction apparatus, the reference point may be positioned on the light axis.

By positioning the reference point on the light axis, the lens unit is turned in the first direction and the second direction about a point on the light axis.

According to a third embodiment of the present disclosure, as for the image blur correction apparatus, a plurality of spheres capable of rolling when the lens unit is turned may be arranged between the slide portion of the lens unit and the support portion of the fixed member.

By arranging between the lens unit slide portion and the fixed member support portion a plurality of spheres that are capable of rolling when the lens unit is turned, the spheres are made to roll when the lens unit turns.

According to a fourth embodiment of the present disclosure, as for the image blur correction apparatus, at least one of the plurality of spheres may be arranged on each of both sides sandwiching an outermost periphery of the slide portion in a light axis direction.

By arranging at least one sphere on each of both sides sandwiching an outermost periphery of the slide portion in the light axis direction, the movement of the lens unit in the light axis direction is regulated by the spheres.

According to a fifth embodiment of the present disclosure, as for the image blur correction apparatus, at least three of the plurality of spheres may be arranged spaced apart in a circumferential direction.

By arranging at least three spheres spaced apart in a circumferential direction, the interval between the lens unit slide portion and the fixed member is fixed.

According to a sixth embodiment of the present disclosure, as for the image blur correction apparatus, a sphere holding frame that has a concave insertion portion into which a part of the plurality of spheres is inserted may be attached to an outer periphery side of the slide portion.

By attaching a sphere holding frame that has concave insertion portions into which a part of the spheres is inserted to an outer periphery side of the slide portion, the spheres are prevented by a sphere holding portion from falling out of the lens unit.

According to a seventh embodiment of the present disclosure, as for the image blur correction apparatus, the first drive unit and the second drive unit may be provided on an outer face side of the lens unit in a light axis direction.

By providing the first drive unit and the second drive unit on an outer face side of the lens unit in the light axis direction, the first drive unit and the second drive unit are not present on the lens unit outer face side.

According to an eighth embodiment of the present disclosure, as for the image blur correction apparatus, the lens unit may be turnably supported by the fixed member in the direction about the light axis.

By supporting the lens unit on the fixed member so that it can turn in the direction about the light axis, in addition to the first direction and the second direction, the lens unit also turns in the direction about the light axis.

According to a ninth embodiment of the present disclosure, as for the image blur correction apparatus, a turning actuator may be configured from the first drive unit and the second drive unit. The lens unit may be turned in the direction about the light axis by the turning actuator.

By configuring a turning actuator from the first drive unit and the second drive unit, and making the lens unit be turned in the direction about the light axis by the turning actuator, a dedicated drive unit for turning the lens unit in the direction about the light axis is not necessary.

According to a ninth embodiment of the present disclosure, there is provided an imaging apparatus including an image blur correction apparatus configured to include a lens unit that includes at least one lens and an outer housing that has the lens unit arranged therein. The lens unit is configured to correct image blur by turning in a first direction which is a direction about a first supporting axis that is orthogonal to a light axis of the lens with respect to the outer housing, and in a second direction which is a direction about a second supporting axis that is orthogonal to the light axis and the first supporting axis. The image blur correction apparatus includes a fixed member configured to be arranged on an outer periphery side of the lens unit and configured to turnably support the lens unit in the first direction and the second direction, a first drive unit configured to turn the lens unit in the first direction, and a second drive unit configured to turn the lens unit in the second direction. A spherical slide portion is formed on an outer periphery of the lens unit using, as a center, a reference point that is a point in the lens unit. A spherical support portion is formed on an inner periphery of the fixed member using the reference point as a center. The slide portion is capable of sliding along the support portion when the lens unit is turned in each of the first direction and the second direction.

Therefore, for the imaging apparatus, in the image blur correction apparatus, the slide portion slides along the support portion, and the lens unit is turned in the first direction and the second direction.

According to an embodiment of the present disclosure, there is provided an image blur correction apparatus including a lens unit configured to include at least one lens and configured to be turnable in a first direction which is a direction about a first supporting axis that is orthogonal to a light axis of the lens with respect to an outer housing, and in a second direction which is a direction about a second supporting axis that is orthogonal to the light axis and the first supporting axis, a fixed member configured to be arranged on an outer periphery side of the lens unit and configured to turnably support the lens unit in the first direction and the second direction, a first drive unit configured to turn the lens unit in the first direction, and a second drive unit configured to turn the lens unit in the second direction. A spherical slide portion is formed on an outer periphery of the lens unit using, as a center, a reference point that is a point in the lens unit. A spherical support portion is formed on an inner periphery of the fixed member using the reference point as a center. The slide portion is capable of sliding along the support portion when the lens unit is turned in each of the first direction and the second direction.

Therefore, the lens unit is turned in a first direction and a second direction with respect to the fixed member, which allows the configuration of the image blur correction apparatus to be made simpler and more compact.

According to an embodiment of the present disclosure, the reference point may be positioned on the light axis.

Therefore, the lens unit is turned in a first direction and a second direction about a point on the light axis, so that a blur correction operation can be carried out more smoothly and blur correction precision can be improved.

According to an embodiment of the present disclosure, a plurality of spheres capable of rolling when the lens unit is turned may be arranged between the slide portion of the lens unit and the support portion of the fixed member.

Therefore, the spheres are made to roll when the lens unit turns, so that a smooth operational state during the turning of the lens unit can be ensured.

According to an embodiment of the present disclosure, at least one of the plurality of spheres may be arranged on each of both sides sandwiching an outermost periphery of the slide portion in a light axis direction.

Therefore, without any movement of the lens unit in the light axis direction, a smooth turning operation of the lens unit can be ensured. Further, since a dedicated regulating member for regulating movement of the lens unit in the light axis direction is not necessary, a reduction in the number of parts and a simpler configuration can be achieved.

According to an embodiment of the present disclosure, at least three of the plurality of spheres may be arranged spaced apart in a circumferential direction.

Therefore, the interval between the lens unit slide portion and the fixed member support portion is fixed, so that a more appropriate blur correction operation can be carried out.

According to an embodiment of the present disclosure, a sphere holding frame that has a concave insertion portion into which a part of the plurality of spheres is inserted may be attached to an outer periphery side of the slide portion.

Therefore, the spheres can be prevented from falling out of the lens unit, and the spheres can be prevented from moving.

According to an embodiment of the present disclosure, the first drive unit and the second drive unit may be provided on an outer face side of the lens unit in a light axis direction.

Therefore, the image blur correction apparatus can be made more compact in the direction orthogonal to the light axis.

According to an embodiment of the present disclosure, the lens unit may be turnably supported by the fixed member in the direction about the light axis.

Therefore, the lens unit can also be turned in the direction about the light axis, so that a blur correction operation can also be performed in the direction about the light axis, thereby enabling a substantial improvement in image quality to be achieved.

According to an embodiment of the present disclosure, a turning actuator may be configured from the first drive unit and the second drive unit. The lens unit may be turned in the direction about the light axis by the turning actuator.

Therefore, a dedicated drive unit for turning the lens unit in the direction about the light axis is not used, so that the configuration of the lens unit can be made simpler and more compact due to a reduction in the number of parts and necessary space.

According to an embodiment of the present disclosure, there is provided an imaging apparatus including an image blur correction apparatus configured to include a lens unit that includes at least one lens and an outer housing that has the lens unit arranged therein. The lens unit is configured to correct image blur by turning in a first direction which is a direction about a first supporting axis that is orthogonal to a light axis of the lens with respect to the outer housing, and in a second direction which is a direction about a second supporting axis that is orthogonal to the light axis and the first supporting axis. The image blur correction apparatus includes a fixed member configured to be arranged on an outer periphery side of the lens unit and configured to turnably support the lens unit in the first direction and the second direction, a first drive unit configured to turn the lens unit in the first direction, and a second drive unit configured to turn the lens unit in the second direction. A spherical slide portion is formed on an outer periphery of the lens unit using, as a center, a reference point that is a point in the lens unit. A spherical support portion is formed on an inner periphery of the fixed member using the reference point as a center. The slide portion is capable of sliding along the support portion when the lens unit is turned in each of the first direction and the second direction.

Therefore, in the image blur correction apparatus, the lens unit turns in a first direction and a second direction with respect to the fixed member, which allows the configuration of the image blur correction apparatus to be made simpler and more compact.

BRIEF DESCRIPTION OF THE DRAWINGS

FIG. 17 is a block diagram of an imaging apparatus.

DETAILED DESCRIPTION OF THE EMBODIMENT(S)

Figure 1:
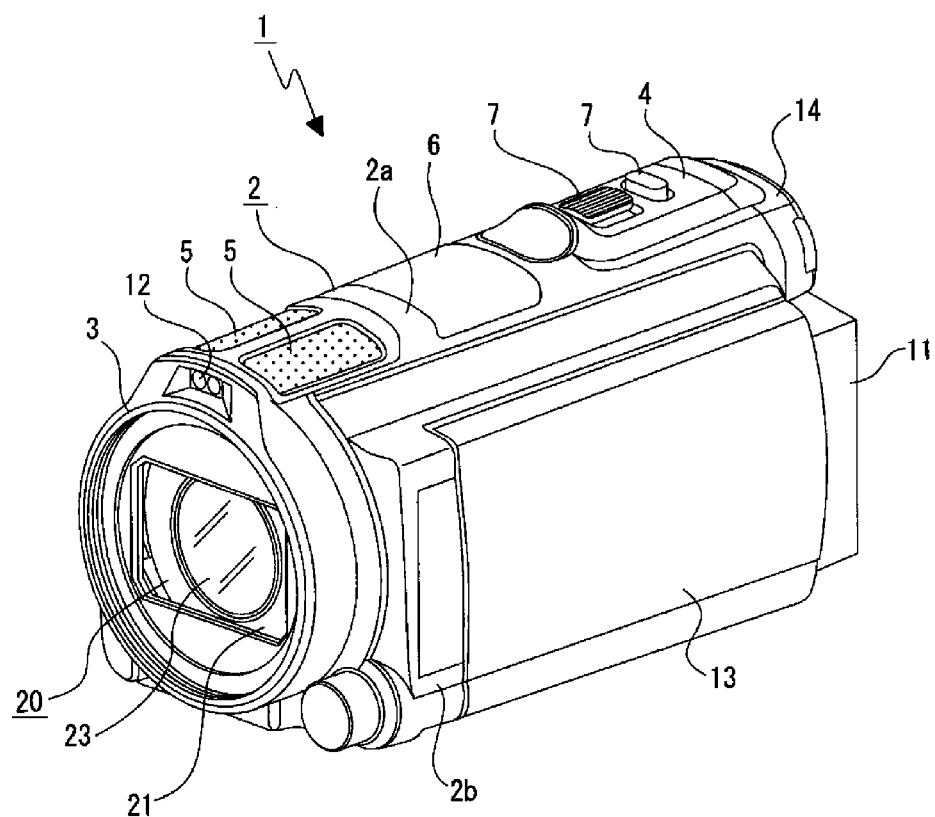
FIG. 1, which along with FIGS. 2 to 17 illustrates an image blur correction apparatus and an imaging apparatus according to an embodiment of the present technology, is a perspective view of an imaging apparatus.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

A best mode for implementing out the image blur correction apparatus and imaging apparatus according to an embodiment of the present technology will now be described with reference to the attached drawings.

The below-illustrated best mode applies the imaging apparatus according to an embodiment of the present technology in a video camera, and applies the image blur correction apparatus according to an embodiment of the present technology as an image blur correction apparatus provided in this video camera.

The applicable scope of the imaging apparatus and image blur correction apparatus according to an embodiment of the present technology is not limited, respectively, to a video camera and an image blur correction apparatus provided in a video camera. The imaging apparatus and image blur correction apparatus according to an embodiment of the present technology can be widely applied as an imaging apparatus incorporated in various devices, for example, a still camera, a mobile telephones, a personal computer and the like, or as an image blur correction apparatus provided in such an imaging apparatus.

In the following description, the front/rear, up/down (hereinafter "vertical"), and left/right (hereinafter, "horizontal") directions represent the directions as seen by the photographer when capturing an image with the video camera. Therefore, the object side becomes the front, and the photographer's side becomes the rear.

It is noted that the front/rear, vertical, and horizontal directions mentioned below are to facilitate the description. The present technology is not limited to these directions.

Further, the lens illustrated below can mean either a lens configured from a single lens, or a lens that is configured as a lens group by a plurality of lenses.

[Overall Configuration of the Imaging Apparatus]

Figure 2:
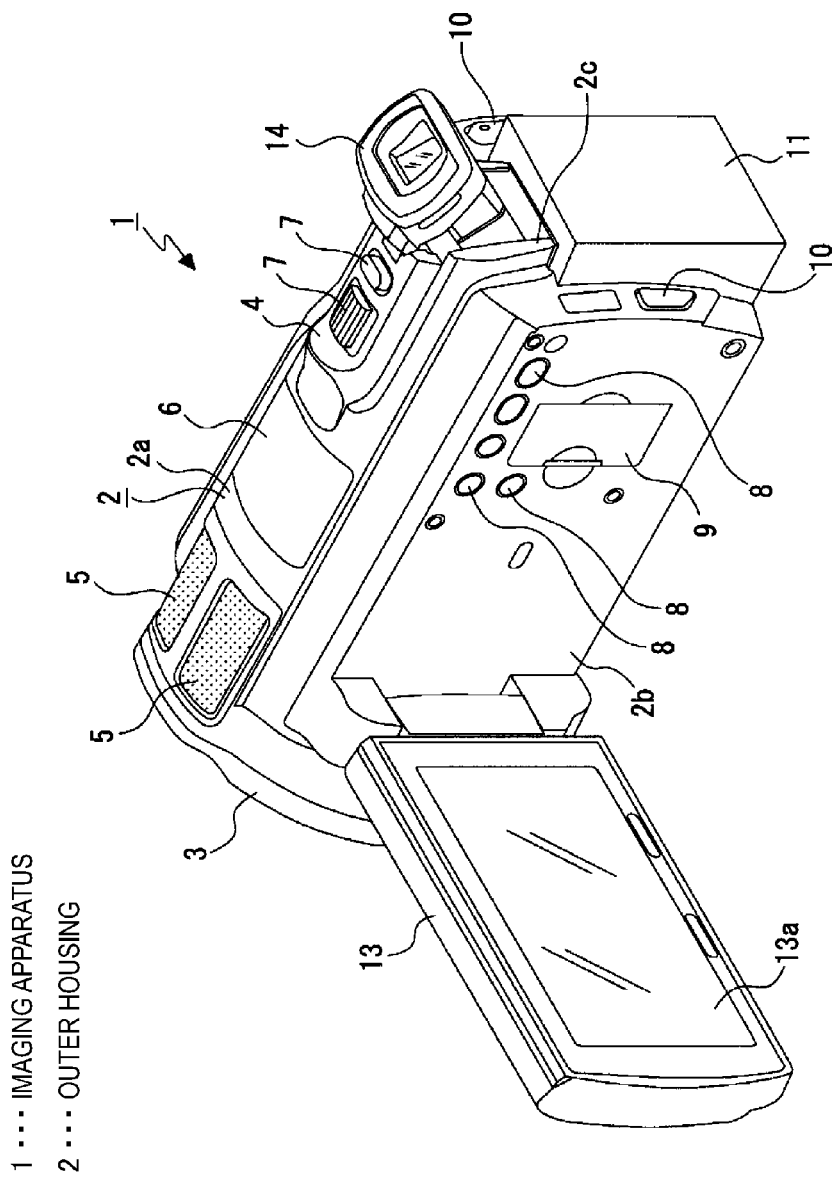
FIG. 2 is a perspective view of an imaging apparatus shown from a different direction to that in FIG. 1.

An imaging apparatus 1 has various parts arranged in and externally to an outer housing 2 (refer to FIGS. 1 and 2). The outer housing 2 is formed in the shape of a casing that is long in the front/rear direction. A front edge portion is provided as a front panel 3, and an upper edge portion at a rear edge portion is provided as a storage case portion 4 that is open to the rear.

Microphones 5 and 5, an interface cover 6, and operating switches 7 and 7 are arranged in order from the front on an upper face 2a of the outer housing 2. The operating switches 7 and 7 are, for example, a zoom lever and imaging buttons.

Various operating buttons 8, 8 . . . , such as a power button and an image playback button, are arranged on one side face 2b of the outer housing 2. A memory card 9 is mounted on one side face 2b of the outer housing 2.

Operating buttons 10 and 10, such as a mode switching button and a recording button, are arranged on a rear face 2c of the outer housing 2.

A battery 11 is mounted on the rear face of the outer housing 2. A part of the battery 11 protrudes towards the rear from the rear face 2c of the outer housing 2.

A flash 12 is arranged on an upper edge portion of the front panel 3. The flash 12, which is used when capturing images at night, irradiates auxiliary light 12 toward the front.

A display unit 13 is turnably and rotatably attached to a side face portion of the outer housing 2. The front edge portion of the display unit 13 is connected to the outer housing 2. The display unit 13 has a display face 13a.

A finder 14 is attached to a rear edge portion of the imaging apparatus 1. The finder 14 can slide in the front/rear direction and can be turned in a tilt direction with respect to the storage case portion 4.

The finder 14 can slide between a storage position, in which the section excluding the rear edge portion is stored in the storage case portion 4, and a pulled-out position, in which the finder 14 has been pulled out from the storage case portion 4. Further, the finder 14 can be turned in a tilt direction about the front edge portion at the pulled-out position.

[Configuration of the Image Blur Correction Apparatus]

An image blur correction apparatus 20 is arranged in the outer housing 2 (refer to FIG. 1). The image blur correction apparatus 20 has a lens unit 21 and a fixed member 22 that supports the lens unit 21 (refer to FIGS. 3 to 5).

Figure 3:
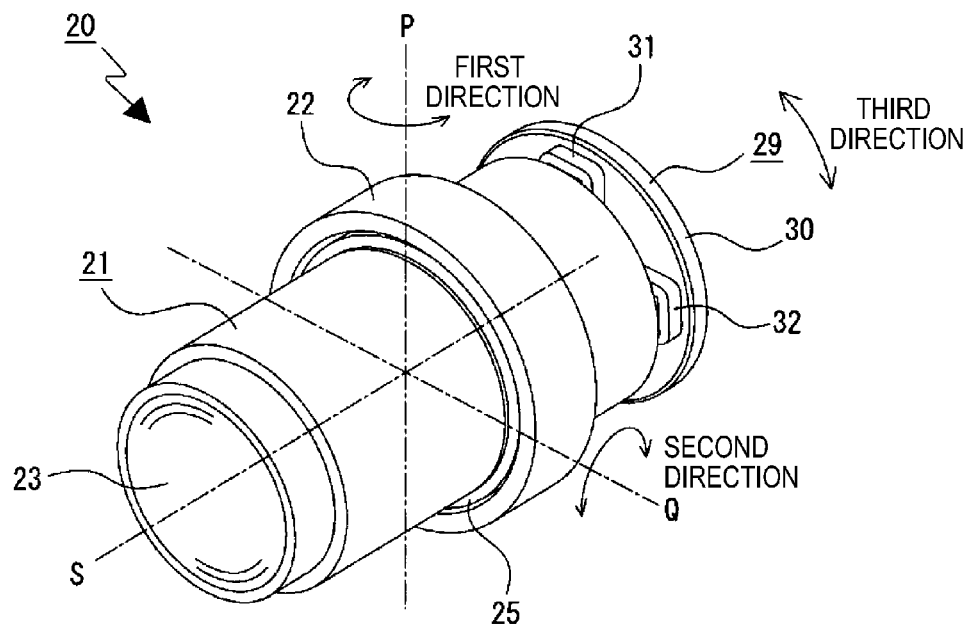
FIG. 3 is a perspective view of an image blur correction apparatus.
Figure 4:
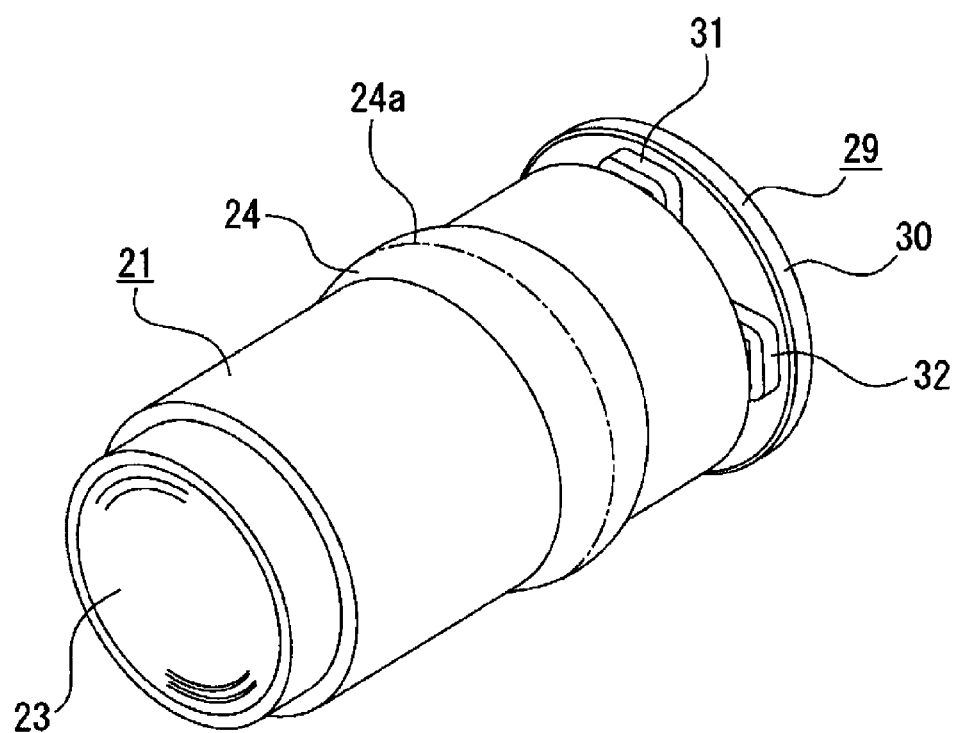
FIG. 4 is a perspective view of an image blur correction apparatus shown with a fixed member and a sphere holding frame omitted.
Figure 5:
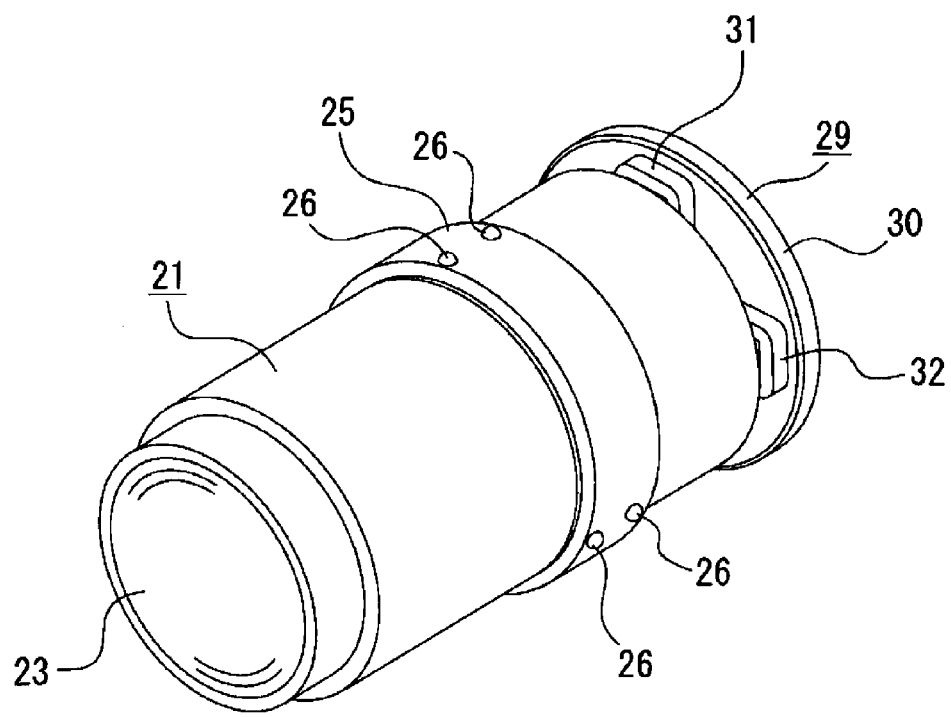
FIG. 5 is a perspective view of an image blur correction apparatus shown with a sphere holding frame omitted.

The lens unit 21 is formed in, for example, a roughly cylindrical shape that extends in a light axis direction (refer to FIGS. 3 to 5). A plurality of lenses or a lens group arrayed in a light axis direction is provided in the lens unit 21. An imaging lens 23, called a "front lens", is arranged at the front-most side (object side).

Figure 6:
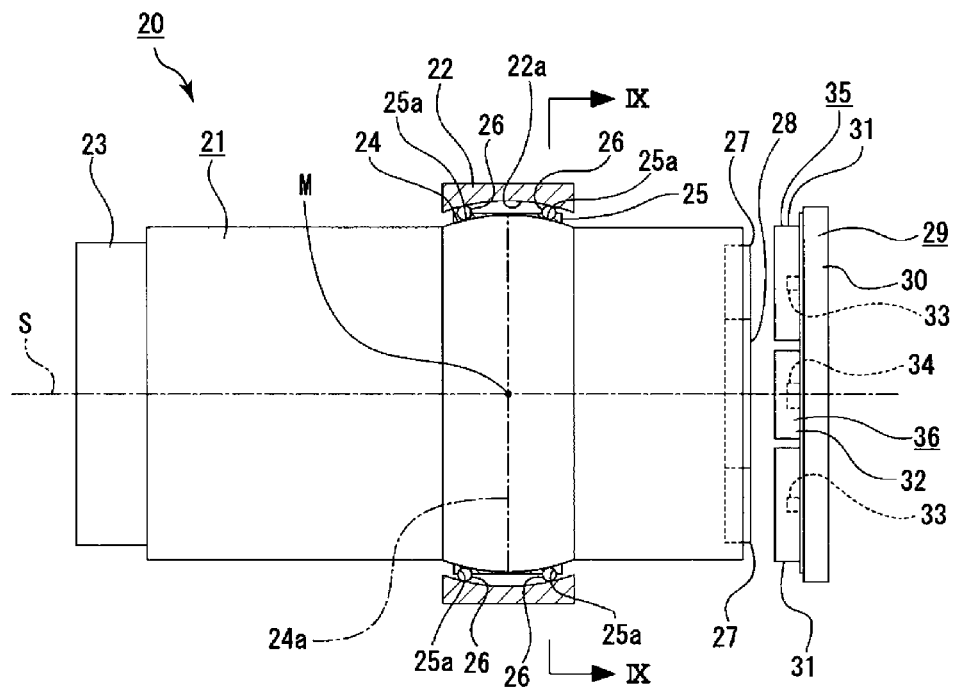
FIG. 6 is a partial cross-sectional side view of an image blur correction apparatus.
Figure 7:
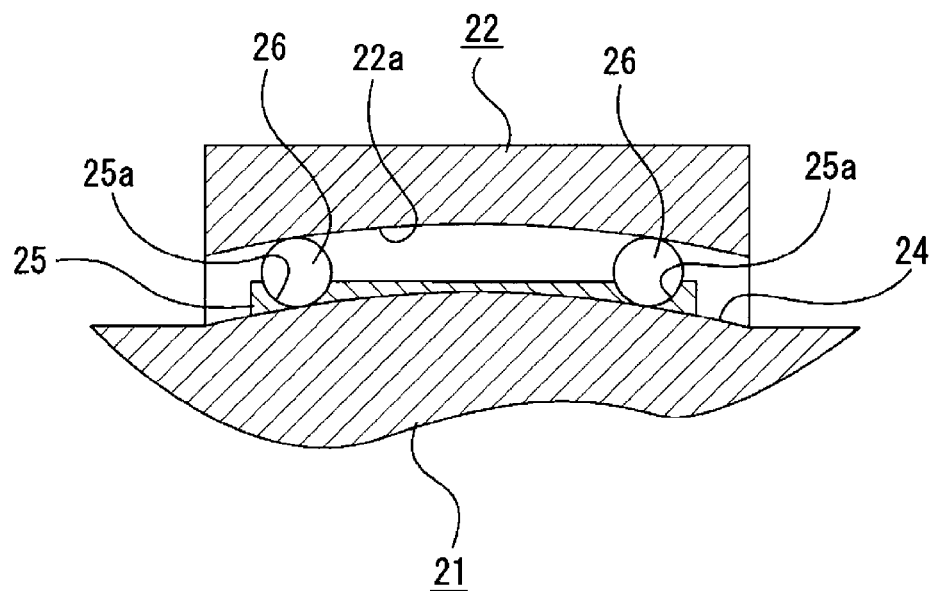
FIG. 7 is an enlarged cross-sectional view illustrating a portion where a lens unit is supported on a fixed member.

A spherically-shaped slide portion 24, which has a diameter greater than the other outer peripheries, is provided on a outer periphery of an intermediate portion in the light axis direction of the lens unit 21 (refer to FIGS. 4, 6, and 7). The slide portion 24 is formed in the shape of a sphere around a reference point M, which is a point in the lens unit 21. The reference point M is, for example, positioned on the light axis S.

A sphere holding frame 25 is slidably supported on the slide portion 24. The sphere holding frame 25 is formed in a roughly circular shape. The inner periphery of the sphere holding frame 25 is formed in a spherical shape that has the same curvature as the slide portion 24. When supported on the slide portion 24, the inner periphery of the sphere holding frame 25 is in close contact with the slide portion 24.

Concave insertion portions 25a, 25a, . . . , which are spaced apart in the circumferential direction, are open in the radial direction, and have a roughly hemispherical shape, are formed on the sphere holding frame 25. The concave insertion portions 25a, 25a, . . . are, for example, formed in groups of three at the front edge portion and the rear edge portion, and are positioned, for example, spaced apart in equal intervals in the circumferential direction.

Spheres 26, 26, . . . are respectively inserted in a rotatable state in the concave insertion portions 25a, 25a, . . . of the sphere holding frame 25. About half of the spheres 26 protrudes from the concave insertion portions 25a when the spheres 26 have been inserted into the concave insertion portions 25a.

At least one, and for example three, spheres 26, 26, . . . are positioned in the light axis direction (front/rear direction) on either side, respectively, of the outermost periphery of the slide portion 24, i.e., sandwiching a center line 24a in the front/rear direction of the slide portion 24. The spheres 26, 26, . . . are positioned so that, for example, pairs of two spheres are each spaced apart in the front/back direction, thereby making a total of six spheres that are provided. It is noted that as long as a plurality of spheres 26 are arranged spaced apart in the circumferential direction, the number of spheres 26 is arbitrary.

The fixed member 22 is formed in a roughly circular shape that is slightly larger than the sphere holding frame 25. The fixed member 22 is arranged on the outer periphery side of the sphere holding frame 25, and its inner periphery is formed as a spherical support portion 22a about the reference point M.

Figure 8:
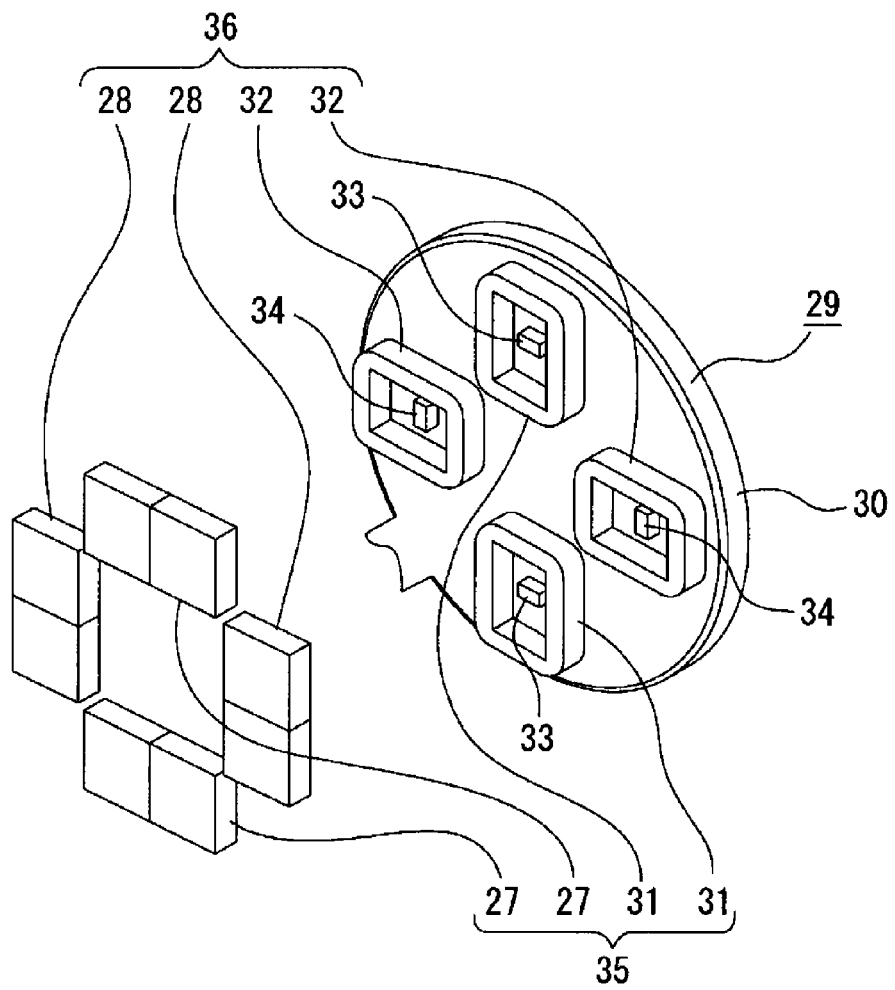
FIG. 8 is an exploded perspective view of a turning actuator.

First drive magnets 27 and 27 and second drive magnets 28 and 28 are attached to the rear face of the lens unit 21 (refer to FIG. 8). The first drive magnets 27 and 27 are vertically positioned sandwiching the light axis, and are magnetized so that the N pole and the S pole are in the horizontal direction. The second drive magnets 28 and 28 are horizontally positioned sandwiching the light axis, and are magnetized so that the N pole and the S pole are in the vertical direction.

A turning actuator 29 is arranged on the rear face side of the lens unit 21. The turning actuator 29 is configured so as to include the first drive magnets 27 and 27 and the second drive magnets 28 and 28.

A circular substrate 30, for example, facing in the front/rear direction is provided on the turning actuator 29. First drive coils 31 and 31 and second drive coils 32 and 32 are attached to the front face of the substrate 30. The first drive coils 31 and 31 are vertically positioned sandwiching the light axis, and the second drive coils 32 and 32 are horizontally positioned sandwiching the light axis.

First detection units 33 and 33 are arranged in a center portion of the first drive coils 31 and 31, respectively, and second detection units 34 and 34 are arranged in a center portion of the second drive coils 32 and 32, respectively.

Figure 9:
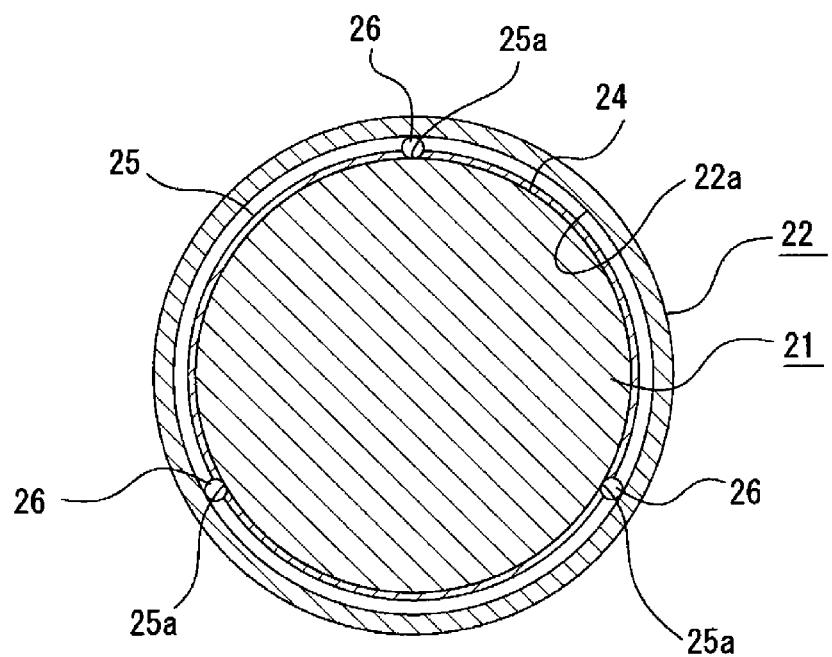
FIG. 9 is a cross-sectional view along the line IX-IX in FIG. 6.

In the thus-configured lens unit 21 and fixed member 22, the lens unit 21 is turnably supported on the fixed member 22 via the spheres 26, 26, . . . (refer to FIGS. 3, 6, and 9). When the lens unit 21 is supported on the fixed member 22, the support portion 22a is in contact with the spheres 26, 26, . . . , and the lens unit 21 is turned via the spheres 26, 26, . . . . Therefore, the slide portion 24 of the lens unit 21 slides along the support portion 22a of the fixed member 22 via the spheres 26, 26, . . . .

The lens unit 21 can be turned with respect to the fixed member 22 in a first direction (yaw direction) about a first supporting axis P that is orthogonal to the light axis S and vertically extends through the reference point M, and in a second direction (pitch direction) about a second supporting axis Q that is orthogonal to the light axis S and the first supporting axis P, and horizontally extends through the reference point M. Further, the lens unit 21 can also be turned in the direction about the light axis (roll direction), which is a third direction.

The first drive magnets 27 and 27 attached to the lens unit 21 and the first drive coils 31 and 31 are respectively positioned facing the front/rear direction. A first drive unit 35 that turns the lens unit 21 in the first direction or the third direction is configured from the first drive magnets 27 and 27 and the first drive coils 31 and 31. In the first drive unit 35, one of the first drive magnets 27 and one of the first drive coils 31 act as a first thrust generation unit that imparts on the lens unit 21 a turning force (thrust) in the first direction or the third direction. Further, the other first drive magnet 27 and the other first drive coil 31 also act as a first thrust generation unit that imparts on the lens unit 21 a turning force (thrust) in the first direction or the third direction.

On the other hand, the second drive magnets 28 and 28 attached to the lens unit 21 and the second drive coils 32 and 32 are respectively positioned facing the front/rear direction. A second drive unit 36 that turns the lens unit 21 in the first direction or the third direction is configured from the second drive magnets 28 and 28 and the second drive coils 32 and 32. In the second drive unit 36, one of the second drive magnets 28 and one of the second drive coils 32 act as a second thrust generation unit that imparts on the lens unit 21 a turning force (thrust) in the second direction or the third direction. Further, the other second drive magnet 28 and the other second drive coil 32 also act as a second thrust generation unit that imparts on the lens unit 21 a turning force (thrust) in the second direction or the third direction.

It is noted that an example was described above in which the first drive magnets 27 and 27 and the first drive coils 31 and 31 of the first drive unit 35 are positioned vertically spaced apart, and the second drive magnets 28 and 28 and the second drive coils 32 and 32 of the second drive unit 36 are positioned horizontally spaced apart. However, the first drive magnets 27 and 27 and the first drive coils 31 and 31 of the first drive unit 35 may be positioned horizontally spaced apart, and the second drive magnets 28 and 28 and the second drive coils 32 and 32 of the second drive unit 36 may be positioned vertically spaced apart.

Further, although an example was described above in which the first drive magnets 27 and 27 and the second drive magnets 28 and 28 are arranged in the lens unit 21, and the first drive coils 31 and 31 and the second drive coils 32 and 32 are arranged on the substrate 30, conversely, the drive coils may be arranged on the lens unit 21 and the drive magnets may be arranged on the substrate 30.

Figure 10:
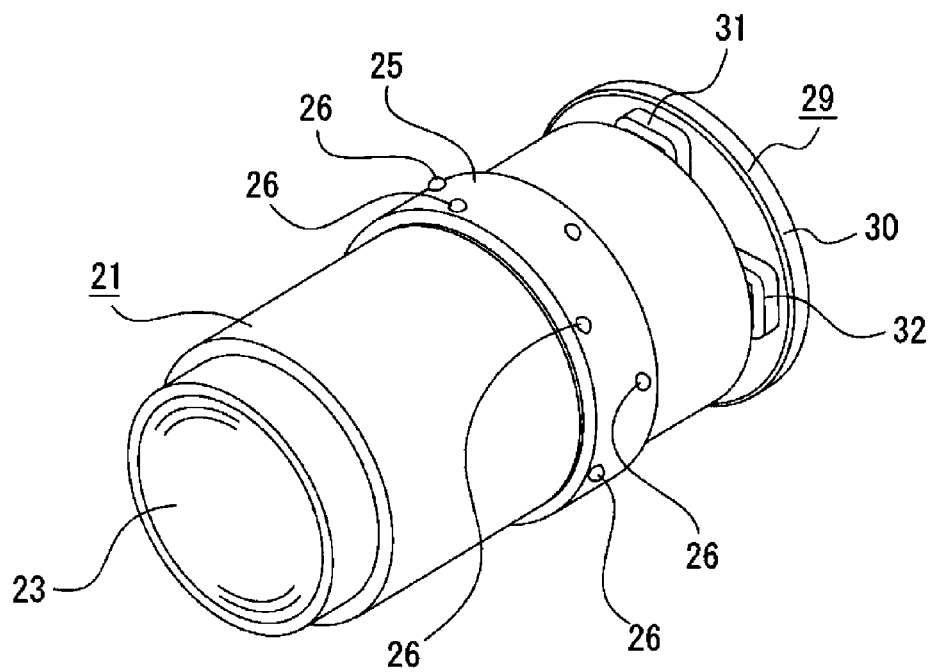
FIG. 10 is a perspective view illustrating an arrangement example of spheres.

In addition, although an example was described above in which pairs of two spheres 26, 26, . . . are spaced apart in the front/rear direction, and each pair is spaced art at equal intervals in the circumferential direction, the spheres 26, 26, . . . may also be positioned alternately in the front/rear direction spaced apart in the circumferential direction (refer to FIG. 10). Even in this case, it is preferred that the spheres 26, 26, . . . are positioned alternately in a front/rear direction spaced apart in the circumferential direction sandwiching the center line 24a of the slide portion 24.

Moreover, although an example was described above in which the lens unit 21 is formed in a roughly cylindrical shape, and the fixed member 22 is formed in a roughly circular shape, these respective parts are not limited to a cylindrical shape and a circular shape. For example, like the image blur correction apparatuses 20A and 20B illustrated in FIGS. 11 and 12, fixed members 22A and 22B having a rectangular external shape may be provided, in which the fixed members 22A and 22B are respectively configured from frame-shaped portions 22b and 22c and protrusions 22d, 22d, 22d, 22e, 22e, and 22e, which protrude inwardly from frame-shaped portions 22b and 22c and are formed having a spherical tip face.

In this case, lens units 21A and 21B having an external shape that is not cylindrical can be provided by forming the portion that slides along the fixed member 22A via the spheres 26, 26, . . . in a spherical shape.

Figure 11:
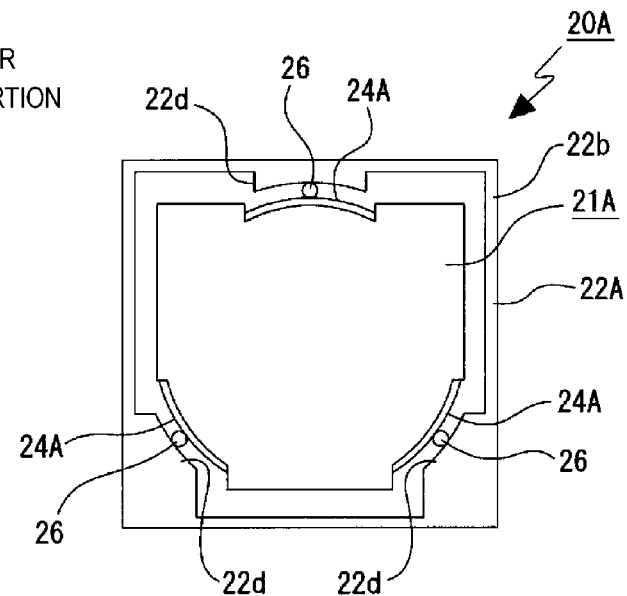
FIG. 11 is a cross-sectional view illustrating an example in which a fixed member is formed in a rectangular shape.
Figure 12:
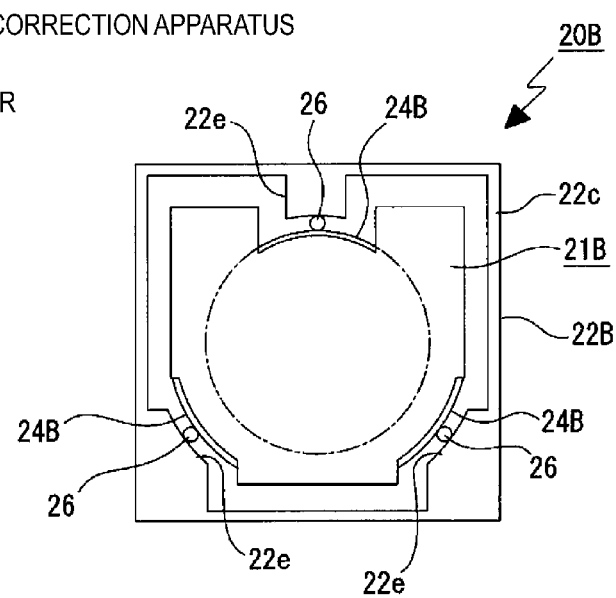
FIG. 12 is a cross-sectional view illustrating a separate example in which a fixed member is formed in a rectangular shape.

The lens unit 21A is an example in which slide portions 24A, 24A, and 24A, which have a spherical shape, are positioned on the same circumference (refer to FIG. 11). The lens unit 21B is an example in which at least one of slide portions 24B, 24B, and 24B is not positioned on the same circumference (refer to FIG. 12).

By configuring so that at least one of the slide portions 24B, 24B, and 24B is not positioned on the same circumference, like in lens unit 21B, an improvement in the degree of design freedom can be obtained.

[Operation of the Image Blur Correction Apparatus]

The blur correction operation performed in the image blur correction apparatus 20 will now be described.

In a state before the blur correction operation is carried out, the image blur correction apparatus 20 is at a reference position where there has been no turning in the first direction, the second direction, or the third direction.

Figure 13:
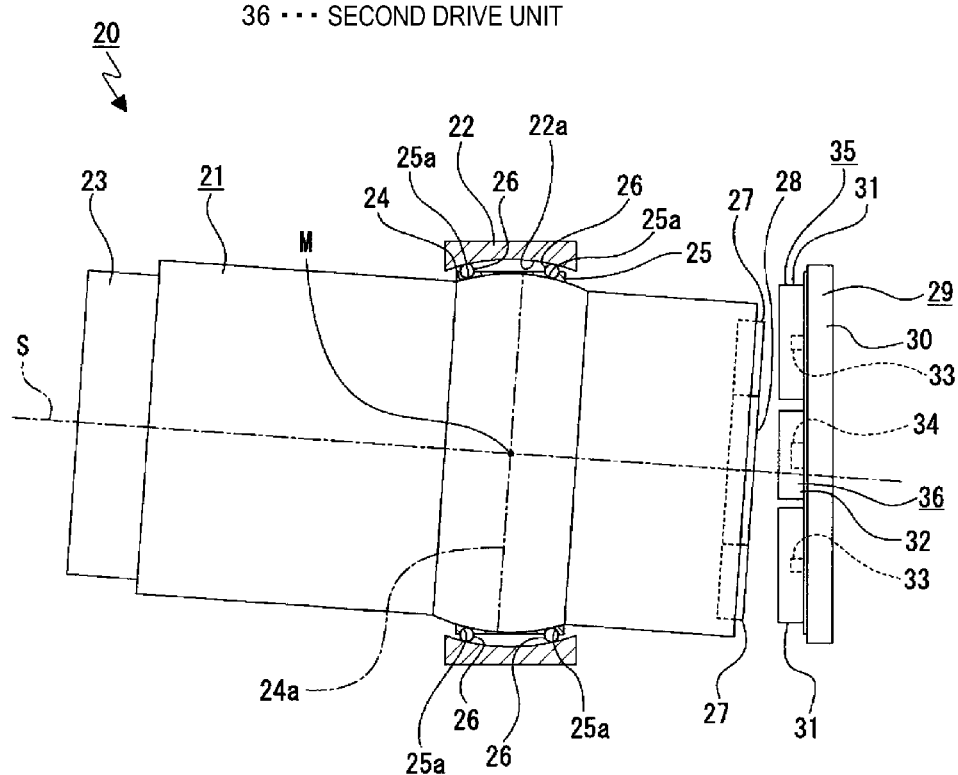
FIG. 13, which along with FIGS. 14 and 15 illustrates operation of an image blur correction apparatus, is a diagram illustrating a state in which a lens unit has been turned in a first direction.

In the image blur correction apparatus 20, when power is supplied to the first drive coils 31 and 31 of the first drive unit 35 so that, for example, thrust is produced in the same direction, a blur correction operation is carried out by the lens unit 21 being turned in the first direction about the first supporting axis P (refer to FIG. 13). At this stage, the blur correction operation of the lens unit 21 is smoothly carried out by the sphere holding frame 25 sliding along the slide portion 24 in conjunction with the rolling of the spheres 26, 26, . . . along the fixed member 22 due to the turning of the lens unit 21.

Figure 14:
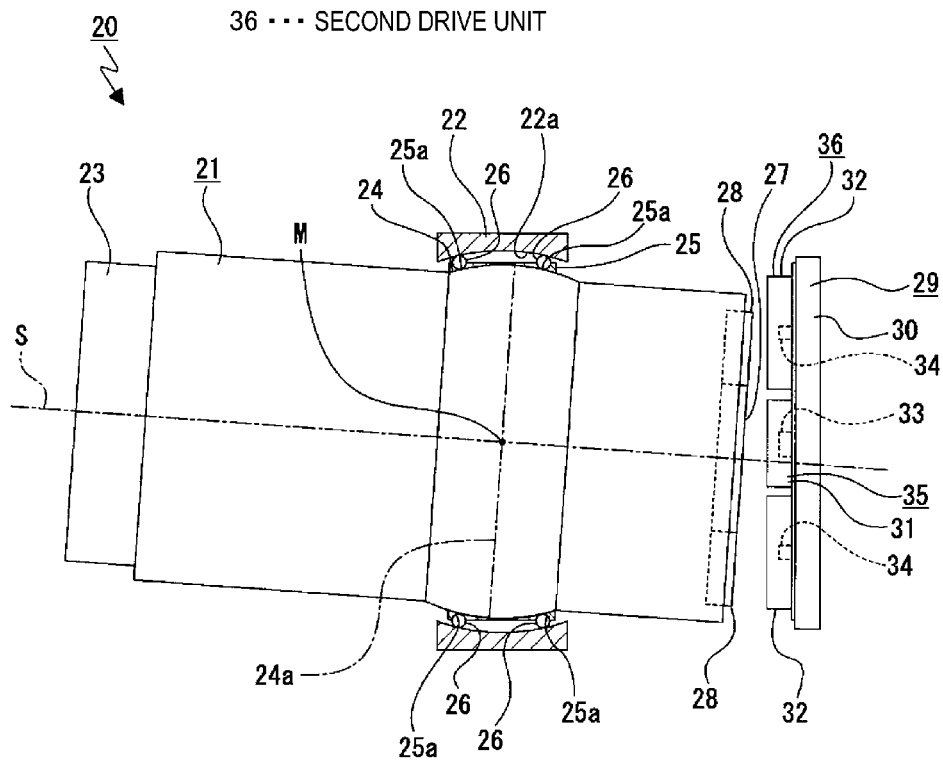
FIG. 14 is a diagram illustrating a state in which a lens unit has been turned in a second direction.

On the other hand, when power is supplied to the second drive coils 32 and 32 of the second drive unit 36 so that, for example, thrust is produced in the same direction, a blur correction operation is carried out by the lens unit 21 being turned in the second direction about the second supporting axis Q (refer to FIG. 14). At this stage, the blur correction operation of the lens unit 21 is smoothly carried out by the sphere holding frame 25 sliding along the slide portion 24 in conjunction with the rolling of the spheres 26, 26, . . . along the fixed member 22 due to the turning of the lens unit 21.

Figure 15:
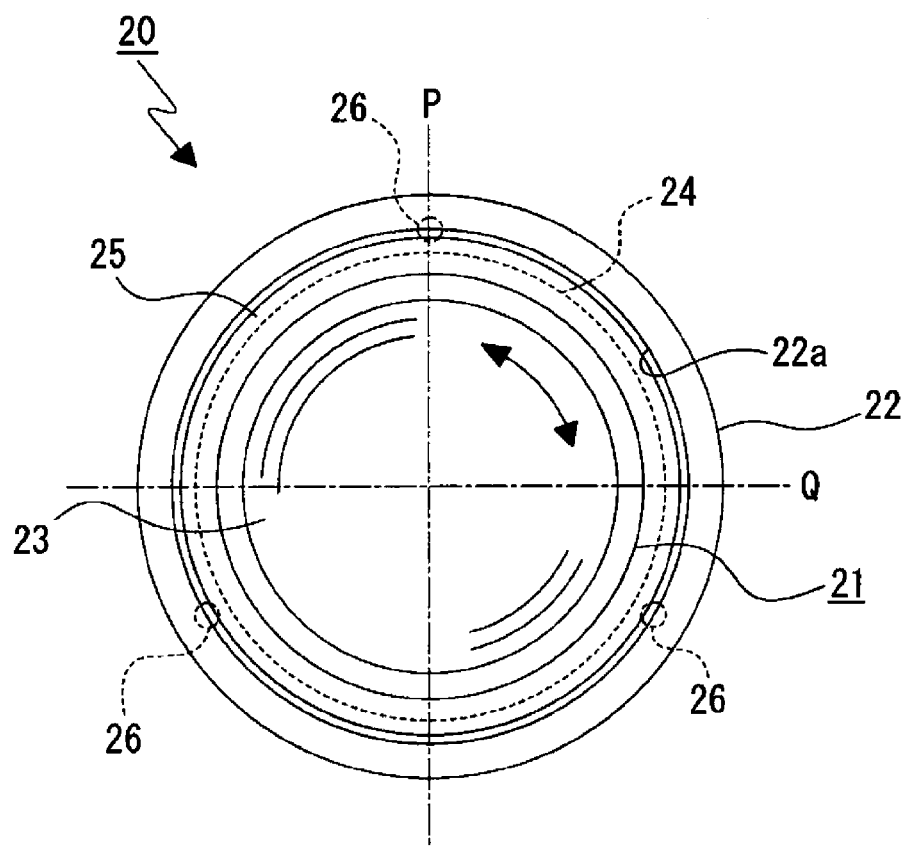
FIG. 15 is a diagram illustrating a state in which a lens unit has been turned in a third direction.

Further, when power is supplied to the first drive coils 31 and 31 of the first drive unit 35 so that, for example, thrust is produced in different directions, and power is supplied to the second drive coils 32 and 32 of the second drive unit 36 so that, for example, thrust is produced in different directions, a blur correction operation is carried out by the lens unit 21 being turned in the third direction (refer to FIG. 15). It is noted that even when the supply of power to the first drive coils 31 and 31 of the first drive unit 35 so that, for example, thrust is produced in different directions, and the supply of power to the second drive coils 32 and 32 of the second drive unit 36 so that, for example, thrust is produced in different directions, is carried out simultaneously, the lens unit 21 can turn in the third direction. At this stage, the blur correction operation of the lens unit 21 is smoothly carried out by the sphere holding frame 25 sliding along the slide portion 24 in conjunction with the rolling of the spheres 26, 26, . . . along the fixed member 22 due to the turning of the lens unit 21.

During the above blur correction operation, the position of the lens unit 21 in the first direction is continuously detected by detecting changes in the magnetic field of the first drive magnets 27 and 27 with the first detection units 33 and 33, and the position of the lens unit 21 in the second direction is continuously detected by detecting changes in the magnetic field of the second drive magnets 28 and 28 with the second detection units 34 and 34. Simultaneously with this, the position of the lens unit 21 in the third direction is continually detected by the first detection units 33 and 33 or the second detection units 34 and 34, or both of these.

As described above, in the image blur correction apparatus 20, the first drive unit 35 and the second drive unit 36 are provided on the outer face side (rear face side) of the lens unit 21 in the light axis direction.

Therefore, the image blur correction apparatus 20 can be made more compact in the direction orthogonal to the light axis S.

Further, the lens unit 21 can be turned on the fixed member 22 in the direction about the light axis.

Therefore, the lens unit 21 can also be turned in the direction about the light axis, which is the third direction, so that a blur correction operation can also be performed in the direction about the light axis. Consequently, a substantial improvement in image quality can be achieved.

In addition, the lens unit 21 is turned in the direction about the light axis by the turning actuator 29, which is configured from the first drive unit 35 and the second drive unit 36 that turn the lens unit 21 in the first direction and the second direction, respectively.

Therefore, a dedicated drive unit for turning the lens unit 21 in the direction about the light axis is not used, so that the configuration of the lens unit 21 can be made simpler and more compact due to a reduction in the number of parts and necessary space.

Other Examples

Figure 16:
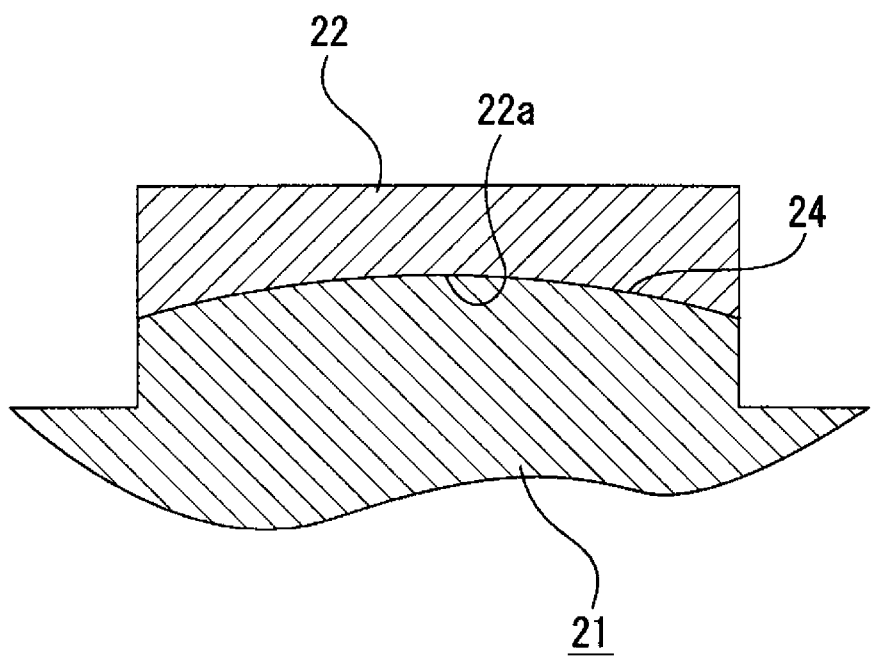
FIG. 16 is a cross-sectional view illustrating an example in which a lens unit is supported on a fixed member with no spheres provided.

Although an example was described above in which the lens unit 21 is turnably supported on the fixed member 22 via the spheres 26, 26, . . . , the lens unit 21 can also be turnably supported on the fixed member 22 without providing the spheres 26, 26, . . . (refer to FIG. 16). In this case, the slide portion 24 of the lens unit 21 and the support portion 22a of the fixed member 22 are formed in a spherical shape having the same curvature, and when these two parts are brought close together, and the lens unit 21 is turned, the slide portion 24 slides along the support portion 22a.

Thus, the number of parts can be reduced and the apparatus can be made more compact by enabling the lens unit 21 to turn without the use of spheres 26, 26, . . . .

[Imaging Apparatus Embodiment]

FIG. 17 illustrates a block diagram of a video camera according to an embodiment of the imaging apparatus of the present technology.

An imaging apparatus (video camera) 100 (corresponding to the imaging apparatus 1) has a lens unit 101 (corresponding to lens units 21, 21A, and 21B) that is responsible for an imaging function, a camera signal processing unit 102 that performs signal processing such as analog-digital conversion of a captured image signal, and an image processing unit 103 that performs recording and playback processing of the image signal. Further, the imaging apparatus 100 includes an image display unit 104 such as a liquid crystal panel, which displays captured images and the like, a R/W (reader/writer) 105 that reads/writes image signals from/to a memory card 1000, a CPU (central processing unit) 106 that controls the whole imaging apparatus 100, an input unit 107 (corresponding to operating switch 7, operating button 8, and operating button 10) configured from various switches and the like, on which operations are performed by the user, and a lens drive control unit 108 that controls the drive of the lenses arranged in the lens unit 101.

The lens unit 101 is configured from, for example, an optical system that includes a lens group 109 (corresponding to the lens group provided in the lens units 21, 21A, and 21B), and an image sensor 110 such as a CCD (charge-coupled device) or a CMOS (complementary metal-oxide semiconductor) and the like.

The camera signal processing unit 102 performs various types of signal processing, such as conversion of an output signal from the image sensor 110 into a digital signal, noise reduction, image correction, and conversion into luminance/color difference signal.

The image processing unit 103 performs, for example, compression and encoding/decompression and decoding of image signals based on a predetermined image data format, and conversion processing of the data specification, such as the resolution.

The image display unit 104 has a function for displaying various data, such as an operation state and captured images, on the input unit 107 of the user.

The R/W 105 performs writing of the image data encoded by the image processing unit 103 onto the memory card 1000 and reading of the image data recorded on the memory card 1000.

The CPU 106 functions as a control processing unit that controls the respective circuit blocks provided in the imaging apparatus 100, and controls the respective circuit blocks based on instruction input signals and the like from the input unit 107.

The input unit 107 is configured from, for example, a shutter release lever for performing a shutter operation, and a selection switch for selecting an operation mode. The input unit 107 outputs instruction input signals to the CPU 106 based on the operation made by the user.

The lens drive control unit 108 controls (not illustrated) motors and the like that drive the respective lenses of the lens group 109 based on control signals from the CPU 106.

The memory card 1000 is, for example, a semiconductor memory that can be inserted into and removed from a slot connected to the R/W 105.

The operations performed by the imaging apparatus 100 will now be described.

In an imaging standby state, under the control of the CPU 106, an image signal captured by the lens unit 101 is output to the image display unit 104 via the camera signal processing unit 102, and is displayed as a camera still image. Further, when an instruction input signal for zooming is input from the input unit 107, the CPU 106 outputs a control signal to the lens drive control unit 108, and a predetermined lens in the lens group 109 is moved based on a control from the lens drive control unit 108.

When a (not illustrated) shutter in the lens unit 101 is operated by an instruction input signal from the input unit 107, the captured image signal is output from the camera signal processing unit 102 to the image processing unit 103, subjected to compression and encoding processing, and is converted into digital data having a predetermined data format. The converted data is output to the R/W 105, and is written in the memory card 1000.

Focusing and zooming are performed by the lens drive control unit 108 moving a predetermined lens in the lens group 109 based on a control signal from the CPU 106.

When playing back image data recorded in the memory card 1000, based on an operation on the input unit 107, predetermined image data is read from the memory card 1000 by the R/W 105, and decompression and decoding processing is performed by the image processing unit 103. Then, the playback image signal is output to the image display unit 104, and the playback image is displayed.

[Conclusion]

As described above, for the imaging apparatus 1, spherical slide portions 24, 24A, and 24B of lens units 21, 21A, and 21B can slide along a spherical support portion 22a of fixed members 22, 22A, and 22B, and lens units 21, 21A, and 21B are turnably supported on fixed members 22, 22A, and 22B.

Therefore, lens units 21, 21A, and 21B are turned in a first direction and a second direction with respect to fixed members 22, 22A, and 22B, so that the configuration of image blur correction apparatuses 20, 20A, and 20B can be simplified and made more compact.

Further, by positioning the reference point M on the light axis S, lens units 21, 21A, and 21B are turned in the first direction and the second direction about a point on the light axis S, so that the blur correction operation can be carried out more smoothly and blur correction precision can be improved.

In addition, in blur correction apparatuses 20, 20A, and 20B, a plurality of spheres 26, 26, . . . that are capable of rolling are arranged between slide portions 24, 24A, and 24B of lens units 21, 21A, and 21B and support portions 22a, 22a, and 22a of fixed members 22, 22A, and 22B.

Therefore, a smooth operational state during turning of lens units 21, 21A, and 21B can be ensured.

In addition, at least one of the spheres 26, 26, ... is arranged on either side, respectively, sandwiching the outermost periphery of slide portions 24, 24A, and 24B in the light axis direction.

Therefore, without any movement of lens units 21, 21A, and 21B in the light axis direction, a smooth turning operation of lens units 21, 21A, and 21B can be ensured. Further, since a dedicated regulating member for regulating movement in the light axis direction of lens units 21, 21A, and 21B is not necessary, a reduction in the number of parts and a simpler configuration can be achieved.

Further, by arranging at least three spheres 26, 26, ... in the circumferential direction, the interval between slide portions 24, 24A, and 24B of lens units 21, 21A, and 21B and support portions 22a, 22a, and 22a of fixed members 22, 22A, and 22B is fixed, so that a more appropriate blur correction operation can be carried out.

In addition, since a sphere holding frame 25 is provided that has concave insertion portions 25a, 25a, ... into which a part of the spheres 26, 26, ... is inserted, the spheres 26, 26, ... can be prevented from falling out of lens units 21, 21A, and 21B, and the spheres 26, 26, ... can be prevented from moving.

[Present Technology]

Additionally, the present technology may also be configured as below.

(1) An image blur correction apparatus including:

a lens unit configured to include at least one lens and configured to be turnable in a first direction which is a direction about a first supporting axis that is orthogonal to a light axis of the lens with respect to an outer housing, and in a second direction which is a direction about a second supporting axis that is orthogonal to the light axis and the first supporting axis;

a fixed member configured to be arranged on an outer periphery side of the lens unit and configured to turnably support the lens unit in the first direction and the second direction;

a first drive unit configured to turn the lens unit in the first direction; and a second drive unit configured to turn the lens unit in the second direction, wherein a spherical slide portion is formed on an outer periphery of the lens unit using, as a center, a reference point that is a point in the lens unit, wherein a spherical support portion is formed on an inner periphery of the fixed member using the reference point as a center, and wherein the slide portion is capable of sliding along the support portion when the lens unit is turned in each of the first direction and the second direction.

(2) The image blur correction apparatus according to (1), wherein the reference point is positioned on the light axis.

(3) The image blur correction apparatus according to (1) or (2), wherein a plurality of spheres capable of rolling when the lens unit is turned are arranged between the slide portion of the lens unit and the support portion of the fixed member.

(4) The image blur correction apparatus according to (3), wherein at least one of the plurality of spheres is arranged on each of both sides sandwiching an outermost periphery of the slide portion in a light axis direction.

(5) The image blur correction apparatus according to (3) or (4), wherein at least three of the plurality of spheres are arranged spaced apart in a circumferential direction.

(6) The image blur correction apparatus according to any one of (3) to (5), wherein a sphere holding frame that has a concave insertion portion into which a part of the plurality of spheres is inserted is attached to an outer periphery side of the slide portion.

(7) The image blur correction apparatus according to any one of (1) to (6), wherein the first drive unit and the second drive unit are provided on an outer face side of the lens unit in a light axis direction.

(8) The image blur correction apparatus according to (7), wherein the lens unit is turnably supported by the fixed member in the direction about the light axis.

(9) The image blur correction apparatus according to (8), wherein a turning actuator is configured from the first drive unit and the second drive unit, and wherein the lens unit is turned in the direction about the light axis by the turning actuator.

(10) An imaging apparatus including:

an image blur correction apparatus configured to include a lens unit that includes at least one lens and an outer housing that has the lens unit arranged therein, wherein the lens unit is configured to correct image blur by turning in a first direction which is a direction about a first supporting axis that is orthogonal to a light axis of the lens with respect to the outer housing, and in a second direction which is a direction about a second supporting axis that is orthogonal to the light axis and the first supporting axis, and wherein the image blur correction apparatus includes a fixed member configured to be arranged on an outer periphery side of the lens unit and configured to turnably support the lens unit in the first direction and the second direction, a first drive unit configured to turn the lens unit in the first direction, and a second drive unit configured to turn the lens unit in the second direction, wherein a spherical slide portion is formed on an outer periphery of the lens unit using, as a center, a reference point that is a point in the lens unit, wherein a spherical support portion is formed on an inner periphery of the fixed member using the reference point as a center, and wherein the slide portion is capable of sliding along the support portion when the lens unit is turned in each of the first direction and the second direction.

The specific shapes and structures of the respective parts illustrated in the above-described best mode are merely illustrative of one example of a specific implementation of the present technology. The technical scope of the present technology is not to be interpreted in a limited manner by these.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-122334 filed in the Japan Patent Office on May 29, 2012, the entire content of which is hereby incorporated by reference.

What is claimed is:

1. An image blur correction apparatus comprising:

a lens unit configured to include at least one lens and configured to be turnable in a first direction which is a direction about a first supporting axis that is orthogonal to a light axis of the at least one lens with respect to an outer housing, and in a second direction which is a direction about a second supporting axis that is orthogonal to the light axis and the first supporting axis;

a fixed member configured to be arranged on an outer periphery side of the lens unit and configured to turnably support the lens unit in the first direction and the second direction;

a first drive unit configured to turn the lens unit in the first direction; and a second drive unit configured to turn the lens unit in the second direction, wherein a spherical slide portion is formed on an outer periphery of the lens unit around a reference point as a center of the spherical slide portion, wherein the reference point is a point in the lens unit such that the first supporting axis vertically extends through the reference point and the second support axis horizontally extends through the reference point, wherein a spherical support portion is formed on an inner periphery of the fixed member around the reference point as a center of the spherical support portion, wherein the spherical slide portion is capable of sliding along the spherical support portion when the lens unit is turned in the first direction or the second direction, and wherein a plurality of spheres, capable of rolling when the lens unit is turned, are arranged between the spherical slide portion of the lens unit and the spherical support portion of the fixed member.

2. The image blur correction apparatus according to claim 1, wherein the reference point is positioned on the light axis of the at least one lens.

3. The image blur correction apparatus according to claim 1, wherein at least one of the plurality of spheres is arranged on each of both sides sandwiching an outermost periphery of the spherical slide portion in a direction of the light axis.

4. The image blur correction apparatus according to claim 1, wherein at least three of the plurality of spheres are arranged spaced apart in a circumferential direction along the spherical slide portion.

5. The image blur correction apparatus according to claim 1, wherein a sphere holding frame that has a concave insertion portion into which a part of the plurality of spheres is inserted is attached to an outer periphery side of the spherical slide portion.

6. The image blur correction apparatus according to claim 1, wherein the first drive unit and the second drive unit are provided on an outer face side of the lens unit in a direction of the light axis.

7. The image blur correction apparatus according to claim 6, wherein the lens unit is turnably supported by the fixed member in a direction about the light axis.

8. The image blur correction apparatus according to claim 7, wherein a turning actuator comprises the first drive unit and the second drive unit, and wherein the lens unit is turned in the direction about the light axis by the turning actuator.

9. An imaging apparatus comprising:

an image blur correction apparatus comprising:

a lens unit that includes at least one lens and an outer housing that has the lens unit arranged therein, wherein the lens unit is configured to correct image blur by turning in a first direction about a first supporting axis that is orthogonal to a light axis of the at least one lens with respect to the outer housing, and in a second direction about a second supporting axis that is orthogonal to the light axis and the first supporting axis, a fixed member configured to be arranged on an outer periphery side of the lens unit and configured to turnably support the lens unit in the first direction and the second direction, a first drive unit configured to turn the lens unit in the first direction, and a second drive unit configured to turn the lens unit in the second direction, wherein a spherical slide portion is formed on an outer periphery of the lens unit around a reference point as a center of the spherical slide portion, wherein the reference point is a point in the lens unit such that the first supporting axis vertically extends through the reference point and the second supporting axis horizontally extends through the reference point, wherein a spherical support portion is formed on an inner periphery of the fixed member using the reference point as a center of the spherical support portion, wherein the spherical slide portion is capable of sliding along the spherical support portion when the lens unit is turned in the first direction or the second direction, and wherein a plurality of spheres, capable of rolling when the lens unit is turned, are arranged between the spherical slide portion of the lens unit and the spherical support portion of the fixed member.

10. The image blur correction apparatus according to claim 1, wherein an interval between the spherical slide portion of the lens unit and the spherical support portion of the fixed member is fixed.

* * * * *